United States Patent Office
2,780,131
Patented Feb. 5, 1957

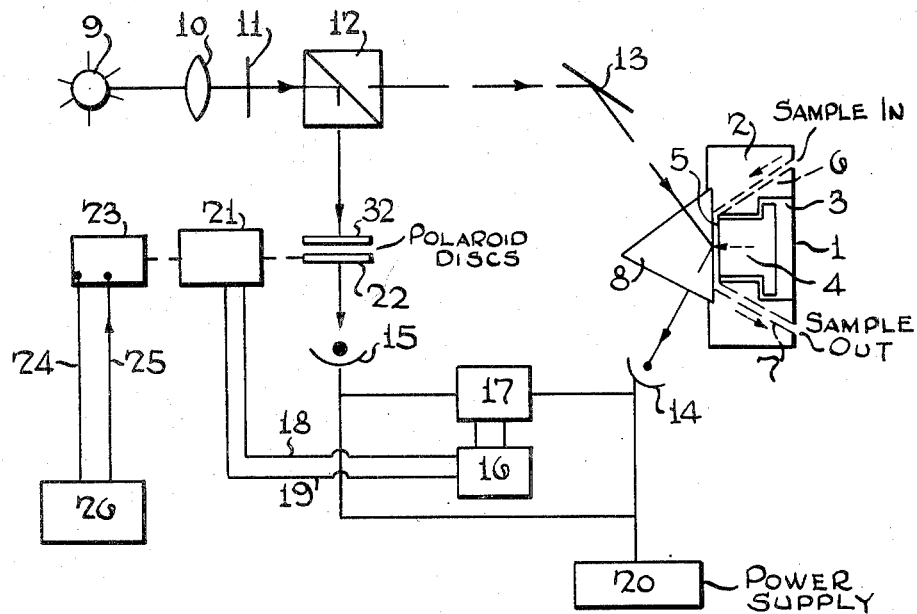

2,780,131
CONTINUOUS RECORDING REFRACTOMETER

Keith P. Lanneau and Bartow Hodge, Baton Rouge, La., assignors to Esso Research and Engineering Company, a corporation of Delaware Application November 19, 1952, Serial No. 321,393

5 Claims. (Cl. 88—14)

This invention concerns a novel apparatus for the continuous determination of the refractive index of fluid samples. The principle and apparatus of this invention is also applicable to the measurement of the refractive index of dark or opaque fluids and solids. The invention is contemplated to be of particular application to the control of processes where refractive index can be used as a process control factor.

In recent times a great deal of effort has been contributed to the development of suitable physical analysis methods for a wide variety of analytical and process control applications. In part, this effort has been encouraged by the wide spread conversion of the majority of chemical and physical processing operations to continuous rather than a batch processing. In continuous processing it becomes important to provide continuous, virtually instantaneous, physical or chemical analyses for control purposes.

The present invention is concerned with the general objective of providing a new analytical process control means which facilitates the continuous and instantaneous determination of the refractive index of virtually any substance. The apparatus disclosed and claimed herein to implement this objective is particularly characterized by a simple optical null detecting system in combination with relatively simple electronic components. The apparatus may be used for the determination of the refractive index of any fluid even though the fluid may be opaque. Beyond this, the apparatus may be employed in order to determine the refractive characteristics of solids.

The refractometer of this invention does not depend upon the transmission of radiation through the sample to be characterized, but utilizes a reflection phenomenon. The sample to be characterized is maintained in a suitable cavity limited by a prism providing an interface between the sample and the prism. Radiation is directed by the prism towards this interface. At the interface a portion of the radiation is reflected while the remainder of the radiation is refracted. The present invention employs the reflected radiation at the prism-sample interface as a measure of refractive index.

By employing this principle and the general type of sample cell indicated, it becomes practical to provide an unusually simple and effective refractometer. Thus, in one form of the invention it is only necessary to determine variations in reflected energy from the prism-sample interface in order to determine variations in and the value of the refractive index of the sample. Preferably, this is conducted so as to compare the intensity of the reflected radiation with a reference beam of radiation to eliminate "drift" and to compensate for changes in intensity of radiation from a source employed. Again it is preferable to employ a null detection system and the invention is readily embodied in such a system.

The nature of this invention is illustrated in the accompanying drawing diagrammatically showing a preferred form of apparatus embodying the principles of the invention. A complete refractometer is indicated in the drawing and represents a continuous recording null system apparatus.

Referring to the drawing, attention will first be drawn to the sample cell employed to contain the material whose refractive index is to be determined. This sample cell is generally indicated by numeral 1. The cell may constitute a body member 2 having a cavity 3 cut in or through the body member. A plug element 4 may be positioned in the cavity in fluid-tight relation so as to define a recess 5 cut away from one face of the body member. Plug element 4 is preferably removable and may be threaded or otherwise arranged to permit movement away from or towards one face of the body member. By this means the depth of the recess referred to can be adjusted and varied as desired in order to control the thickness of the sample to be characterized. Access to the recess may be provided by passageways 6 and 7 cut through the body member. Thus, as employed for the analysis of fluid samples, samples can be continuously passed through passages 6 and 7 so as to carry the sample through the recess in the body member.

The recess referred to is closed off by a prism 8 which is arranged to seat on the face of the body member containing the recess. Radiation following the general path indicated by the arrows may consequently be directed by the prism to an interface between the prism and the sample. At this interface as indicated by the radiation path shown, a portion of the radiation is reflected outwardly through the prism.

In this arrangement a portion of the radiation striking the prism-sample interface is refracted into the sample while a second portion of the radiation is reflected outwardly from the interface as described. This reflection and refraction is governed by the relation:

$$I/I_0 = \frac{\operatorname{Sin}^2 (i_0-r)}{2 \operatorname{Sin}^2 (i_0+r)} + \frac{\operatorname{Tan}^2 (i_0-r)}{2 \operatorname{Tan}^2 (i_0+r)}$$

where $I_0$=Intensity of the incoming beam,
$I$=Intensity of the reflected beam,
$i_0$=angle of incidence of incoming beam at the interface,
$r$=angle of the refracted ray.

From this equation it will be observed that the intensity of the reflected beam can be employed to determine the refractive characteristics of a sample. Since the phenomenon depends upon an interface condition, it is apparent that this principle may be employed regardless of the radiation transmitting properties of the sample. It is this fact which makes possible refractive index determinations of relatively opaque or solid samples.

Employing this principle, selection of a suitable prism becomes important for best results. Any transparent body, including a pane of glass, could be employed to establish the reflecting sample interface. However, reflection of light from the external surface of the transparent body or pane of glass could then occur. This externally reflected light would be superimposed, in part, on the beam reflected from the interface which must be accurately measured. Furthermore, light would be lost due to internal and external reflections, decreasing the sensitivity of the arrangement. To avoid these undesired effects, a prism is preferably employed at the interface of the sample. Furthermore, the prism should be selected so that the incident light beam and the beam reflected from the sample interface, cross the external surface of the prism, at the glass-air interface, on the normal angle. Thereby, minimum reflection losses occur. This desideratum is controlled by the angle of the prism, the refractive index of the prism, and the optical system in which the prism is used.

As indicated therefore, employing a sample cell of the particular character described, refractive index determinations may be made by determination of the incident and reflected radiation at a prism sample interface. The remaining elements of the drawing simply show a preferred manner for obtaining this information.

In order to direct radiation to the prism-sample interface, a light source 9 is employed, which can constitute an ordinary tungsten light source. Radiation from source 9 is passed through a lens 10 which may be provided with a diaphragm to control the intensity of radiation. Lens 10 is employed to collimate the radiation and to direct this radiation towards the filter 11. Filter 11 is an interference filter of the type providing a substantially monochromatic peak radiation transmission. While not essential, it is desirable that filter 11 be employed, or its equivalent, in order to provide monochromatic radiation. While various wave lengths of monochromatic radiation may be employed, it is suitable in determining the refractive index of samples having a value between about 1.0 to 1.7 to employ a wave length of about 590 millimicrons. It may be observed that the filter 11 also provides the function of filtering heat from the radiation employed.

The monochromatic radiation passing through filter 11 is then passed to a beam splitting arrangement 12 which may constitute a partially silvered mirror of a nature to cause reflection of a portion of the energy and to permit transmission of a second portion of the energy. It is desirable that a greater portion of energy be transmitted through the beam splitter than that reflected in order to provide a higher energy level for direction to the prism-sample interface. It is desirable for example, that approximately 30% of the radiation be reflected from the beam splitter while the remaining 70% of radiation is directed toward the prism-sample interface.

Mirror 13 may be suitably positioned to direct radiation transmitted through the beam splitter in the desired path towards the prism 8 of the sample cell. Mirror 13 is preferably maintained on a movable and adjustable mounting so as to vary the incident angle of radiation striking the prism-sample interface in accordance with the principles formerly outlined. Radiation following the general path shown is in part reflected from the prism-sample interface as described and is caused to fall on a detector element 14.

The reference beam of radiation provided by splitter 12 and reflected from the splitter may be passed directly to a second detector 15. Consequently, by comparing the intensity of reflected radiation from the prism-sample interface as determined by detector 14, with the reference beam of radiation as determined by detector 15, it is possible to determine the refractive index of a sample according to the equation given.

For this purpose the detectors 14 and 15 may constitute any desired type of radiation detector providing an indication of the intensity of radiation falling thereon. Bolometers, thermocouples, photocells, or the like can be employed. However, in the preferred form of the invention, detectors 14 and 15 constitute photo-multiplier tubes. These detectors are particularly desirable for use in providing high amplification above noise levels so as to markedly increase the sensitivity of the detection system. The output of the two detectors is impressed on a voltage difference amplifier 16. The voltage difference amplifier 16 is of conventional character of a nature to provide a D. C. electrical signal proportional to the difference in voltage between the two signals impressed on the amplifier. Thus, amplifier 16 provides an output signal through leads 18 and 19, characteristic of the difference in output of detectors 14 and 15.

In this arrangement it becomes practical and desirable to use an alternating current circuit. A conventional A. C. power supply 20 may be used to drive the photo-multipliers 14 and 15 as well as the differential amplifier. The A. C. outputs of the two photo-multipliers, 14 and 15, are converted to ripple free D. C. by means of conventional filters indicated by rectangle 17. The two D. C. signals corresponding to the outputs of the photo-multipliers are then supplied to the differential voltage amplifier 16. By way of example, a suitable differential voltage amplifier is the commercially available model known as a Brown voltage differential amplifier of the character designated in Brown Bulletin 15-14, dated 1950.

The signal provided by the voltage differential amplifier 16 carried through leads 18 and 19 may be supplied to a Selsyn or servomotor 21. This motor will rotate in accordance with the signal supplied thereto and in the system illustrated is employed in a dual function. Thus, motor 21 may be coupled to one of a pair of Polaroid discs positioned in one of the two beams of radiation. As illustrated, the Polaroid discs 22 and 32 are positioned in the path of radiation followed by the reference beam. Motor 21 is employed to rotate Polaroid disc 22 so as to eliminate any voltage differential detected by the detection system. Since this operation is virtually instantaneous, the servomotor 21 serves to drive disc 22 so as to maintain radiation falling on cells 14 and 15 in balance at all times.

In using the Polaroid pair described to attenuate the reference beam so as to balance the reflected beam, a servomotor driven cam is preferably employed. The cam can be shaped to give any desired degree of rotation of the Polaroid disc for each degree of rotation. This attenuation system is particularly desirable in providing homogeneous attenuation of the entire beam eliminating any drift due to changing light distribution in a cross section of the beam.

It is apparent that other optical null systems could be used. For example, a polarizing prism attenuator or a motor driven shutter or wedge could be employed.

A Helipot 23 is also coupled to servomotor 21. As will be understood, the Helipot may be considered to be a potentiometer having a wiper which is moved in proportion to rotation of servomotor 21 to provide a variable resistance indicative of the rotational position of the servomotor. Thus, the Helipot may include a battery in series therewith so that an electrical signal may be obtained through leads 24 and 25 proportional to rotation of Helipot 23 and motor 21. This electrical signal can therefore be recorded by a recorder 26 which may be directly calibrated in terms of refractive index.

The preferred form of the invention described has many advantageous features. Because of the balanced nature of the system, voltage and light source fluctuations are minimized. The system is relatively independent of amplifier gain and linearity. The A. C. photo-multiplier power supply eliminates necessity for a high voltage D. C. power supply. The gain of the photo-multipliers is high enough to permit direct coupling of part of the plate loads to the following amplifier. The apparatus can readily be designed to meet plant safety requirements.

A variety of modifications can be made in the invention. For example, if desired, a sample temperature compensator can be incorporated. This is simply provided by inserting a thermistor element into the sample cavity through a hole drilled for that purpose. The thermistor is arranged in a conventional D. C. bridge circuit, applying the D. C. unbalance of the bridge in series with the Helipot output. The bridge sensitivity may be adjusted to compensate for changes in output signal due to temperature changes of the sample.

What is claimed is:

1. A refractometer comprising in combination: a source of radiation, radiation splitting means positioned in the range of radiation from the source adapted to provide a first and second beam of radiation, a prism having a sample in contact with one face of the prism to provide a prism-sample interface, said prism being positioned in the said first beam of radiation so that radiation is directed toward the said interface, a first radiation detector positioned in the path of reflected radiation from said interface, and a second radiation detector positioned in the second beam of radiation from the source, means to attenuate one of said beams of radiation, including a servo-motor actuation means therefor, and means to determine the differential output of said detectors, including means to energize said servo-motor in response to such differential output thereby to actuate said attenuation means and balance the output of said detectors.

2. A refractometer comprising in combination: a source of radiation, radiation splitting means positioned in the range of radiation from the source and adapted to provide a first and second beam of radiation, a prism having a sample in contact with one face of the prism to provide a prism-sample interface, said prism being positioned in said first beam of radiation so that radiation is directed toward said interface, a first radiation detector positioned in the path of reflected radiation from said interface, a second radiation detector positioned in said second beam of radiation from the source, a differential voltage amplifier adapted to determine the differential output of said detectors and adapted to produce an electrical signal proportional to said differential output, a pair of polarizing discs positioned in one of said beams of radiation, a servo motor adapted to be rotated in response to the electrical signal from said differential voltage amplifier, said servo motor being coupled to one of said pair of polarizing discs to rotate said disc to balance the output of said detectors, and indicating means coupled to said servo motor and adapted to produce a variable electrical signal indicative of the rotational position of said servo motor.

3. The combination of claim 2 in which said radiation splitting means divides said radiation so that said first beam comprises about 70% of said radiation and said second beam comprises about 30% of said radiation.

4. A refractometer comprising in combination: a source of radiation, radiation splitting means positioned in the range of radiation from the source and adapted to provide a first and second beam of radiation, a prism having a sample in contact with one face of the prism to provide a prism-sample interface, said prism being positioned in said first beam of radiation so that radiation is directed toward said interface at an angle incident thereto, means for varying the incident angle of said first beam of radiation with respect to said interface, a first radiation detector positioned in the path of reflected radiation from said interface, a second radiation detector positioned in said second beam of radiation from the source, a differential voltage amplifier adapted to determine the differential output of said detectors and adapted to produce an electrical signal proportional to said differential output, a pair of polarizing discs positioned in one of said beams of radiation, a servo motor adapted to be rotated in response to the electrical signal from said differential voltage amplifier, said servo motor being coupled to one of said pair of polarizing discs to rotate said disc to balance the output of said detectors, and indicating means coupled to said servo motor and adapted to produce a variable electrical signal indicative of the rotational position of said servo motor.

5. A refractometer comprising in combination a source of radiation, radiation splitting means positioned in the range of radiation from the source adapted to provide a first and second beam of radiation, a prism having a sample in contact with one face of the prism to provide a prism sample interface, said prism being positioned in the said first beam of radiation so that radiation is directed toward the said interface, a first radiation detector positioned in the path of reflected radiation from said interface, and a second radiation detector positioned in the second beam of radiation from the source, a means to attenuate one of said beams of radiation including a pair of Polaroid discs disposed in face to face, substantially parallel relation and interposed in said one beam of radiation, and a servo-motor coupled to one of said discs for rotation of said one disc in parallel reference to the other disc of said pair, and means to determine the differential output of said first and second radiation detectors including means to energize said servo-motor in response to said differential output, whereby to rotate said one disc to alter the intensity of said one beam of radiation passed through said pair of discs and thereby to balance the output of said detectors.

References Cited in the file of this patent

UNITED STATES PATENTS

| 1,894,132 | Stone | Jan. 10, 1933 |
| 2,073,223 | Rose | Mar. 9, 1937 |
| 2,244,362 | Hartig | June 3, 1941 |
| 2,612,814 | Glasser | Oct. 7, 1952 |

OTHER REFERENCES

Karrer et al.: "Photoelectric refractometer," Journal of the Optical Society of America, vol. 36, pp. 42–46, January 1946.

"Photoelectricity," by V. K. Zworykin and E. G. Ramberg, published by J. Wiley and Sons, Inc. New York, 1949 ed., Fig. 14.14 on page 283.